(12) United States Patent
Sabato et al.

(10) Patent No.: US 9,160,604 B2
(45) Date of Patent: Oct. 13, 2015

(54) SYSTEMS AND METHODS TO EXPLICITLY REALIGN PACKETS

(71) Applicant: Cisco Technology, Inc., San Jose, CA (US)

(72) Inventors: Simon Luigi Sabato, Saratoga, CA (US); Hugh Barrass, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 220 days.

(21) Appl. No.: 13/797,439

(22) Filed: Mar. 12, 2013

(65) Prior Publication Data

US 2014/0269689 A1    Sep. 18, 2014

(51) Int. Cl.
| | | |
|---|---|---|
| H04L 29/06 | (2006.01) | |
| H04L 7/04 | (2006.01) | |
| H04L 25/14 | (2006.01) | |

(52) U.S. Cl.
CPC ............. *H04L 29/0653* (2013.01); *H04L 7/04* (2013.01); *H04L 25/14* (2013.01)

(58) Field of Classification Search
USPC .................................................. 370/389, 476
See application file for complete search history.

(56) References Cited

U.S. PATENT DOCUMENTS

| | | | |
|---|---|---|---|
| 5,953,345 | A | 9/1999 | Findlater et al. |
| 6,069,897 | A | 5/2000 | Perlman et al. |
| 6,385,208 | B1 | 5/2002 | Findlater et al. |
| 6,631,138 | B1 | 10/2003 | Findlater et al. |
| 6,741,566 | B1 | 5/2004 | Furlong et al. |
| 6,816,505 | B1 | 11/2004 | Sutardja et al. |
| 6,980,563 | B2 | 12/2005 | Barker et al. |
| 7,031,258 | B1 | 4/2006 | Frisch et al. |
| 7,031,333 | B1 | 4/2006 | Findlater et al. |
| 7,177,325 | B2 | 2/2007 | Claseman |

(Continued)

FOREIGN PATENT DOCUMENTS

| | | |
|---|---|---|
| CN | 1522522 A | 8/2004 |
| CN | 101473617 B | 8/2013 |

(Continued)

OTHER PUBLICATIONS

European Application Serial No. 07812999.6, Examination Notification Art. 94(3) mailed Feb. 21, 2014, 5 pgs.

(Continued)

*Primary Examiner* — Awet Haile
*Assistant Examiner* — Kent Krueger
(74) *Attorney, Agent, or Firm* — Meunier Carlin & Curfman LLC

(57) ABSTRACT

Methods and systems to explicitly realign packets are described. The system includes a first communications device that receives a first stream of bytes comprising a first packet and generates realignment information for the first packet based on an alignment restriction. The first communications device further transmits a second stream of bytes over the data path comprising the first packet and the realignment information. The transmitting of the first byte of the first packet over the data path being in accordance with the alignment restriction that is associated with an interface. The realignment information identifies a difference between a time that the first byte of the first packet would have been transmitted by the first communications device without the alignment restriction and a time of transmission of the first byte of the first packet by the first communications device in accordance with the alignment restriction.

20 Claims, 5 Drawing Sheets

(56) References Cited

U.S. PATENT DOCUMENTS

| | | | |
|---|---|---|---|
| 7,257,129 | B2 | 8/2007 | Lee et al. |
| 7,418,514 | B1 | 8/2008 | Lo et al. |
| 7,664,134 | B2 | 2/2010 | Caldwell et al. |
| 7,672,300 | B1 | 3/2010 | Medina et al. |
| 7,719,970 | B1 | 5/2010 | Dada et al. |
| 8,259,748 | B2 * | 9/2012 | Barrass .................. 370/463 |
| 8,385,374 | B1 | 2/2013 | Wohlgemuth |
| 8,842,649 | B2 * | 9/2014 | Liu et al. .................. 370/338 |
| 2001/0014104 | A1 | 8/2001 | Bottorff et al. |
| 2001/0043603 | A1 | 11/2001 | Yu et al. |
| 2002/0126684 | A1 | 9/2002 | Findlater et al. |
| 2002/0191603 | A1 | 12/2002 | Shin et al. |
| 2003/0088726 | A1 | 5/2003 | Dillabough et al. |
| 2003/0188026 | A1 | 10/2003 | Denton et al. |
| 2003/0214975 | A1 | 11/2003 | Woelk et al. |
| 2003/0217215 | A1 | 11/2003 | Taborek et al. |
| 2004/0022238 | A1 | 2/2004 | Kimmitt |
| 2004/0123190 | A1 | 6/2004 | Toyida et al. |
| 2004/0202198 | A1 | 10/2004 | Walker et al. |
| 2005/0019036 | A1 | 1/2005 | Soto et al. |
| 2005/0102419 | A1 | 5/2005 | Popescu et al. |
| 2005/0163149 | A1 | 7/2005 | Unitt et al. |
| 2005/0259685 | A1 | 11/2005 | Chang et al. |
| 2006/0109784 | A1 | 5/2006 | Weller et al. |
| 2006/0268938 | A1 | 11/2006 | Terry |
| 2007/0047572 | A1 | 3/2007 | Desai et al. |
| 2007/0110103 | A1 | 5/2007 | Zimmerman et al. |
| 2008/0019389 | A1 | 1/2008 | Barrass |
| 2010/0111100 | A1 * | 5/2010 | Baumer .................. 370/465 |
| 2012/0320915 | A1 | 12/2012 | Barrass |

FOREIGN PATENT DOCUMENTS

| | | |
|---|---|---|
| WO | 03/096620 | 11/2003 |
| WO | WO-2008014145 A2 | 1/2008 |
| WO | WO-2008014145 A3 | 1/2008 |

OTHER PUBLICATIONS

"U.S. Appl. No. 11/459,348, Advisory Action mailed Jan. 12, 2011", 3 pgs.

"U.S. Appl. No. 11/459,348, Final Office Action mailed Aug. 17, 2009", 9 pgs.

"U.S. Appl. No. 11/459,348, Final Office Action mailed Oct. 21, 2010", 14 pgs.

"U.S. Appl. No. 11/459,348, Non Final Office Action mailed Dec. 26, 2009", 7 pgs.

"U.S. Appl. No. 11/459,348, Non-Final Office Action mailed Apr. 30, 2010", 12 pgs.

"U.S. Appl. No. 11/459,348, Notice of Allowance mailed May 7, 2012", 9 pgs.

"U.S. Appl. No. 11/459,348, Response filed Apr. 21, 2009 to Non Final Office Action mailed Jan. 26, 2009", 14 pgs.

"U.S. Appl. No. 11/459,348, Response filed Nov. 17, 2009 to Final Office Action mailed Aug. 17, 2009", 13 pgs.

"U.S. Appl. No. 11/459,348, Response filed Dec. 21, 2010 to Final Office Action mailed Oct. 21, 2010", 14 pgs.

"U.S. Appl. No. 11/459,348, Response filed Aug. 2, 2010 to Non Final Office Action mailed Apr. 30, 2010", 16 pgs.

"Chinese Application Serial No. 200780023041.0, Office Action mailed Dec. 14, 2010", with English translation of claims, 19 pgs.

"Chinese Application Serial No. 200780023041.0, Notice of Decision to Grant mailed May 6, 2013", with English translation, 3 pgs.

"Chinese Application Serial No. 200780023041.0, Office Action mailed Apr. 6, 2012", With English Translation, 15 pgs.

"Chinese Application Serial No. 200780023041.0, Office Action mailed May 25, 2011", with English translation of claims, 9 pgs.

"Chinese Application Serial No. 200780023041.0, Office Action mailed Dec. 18, 2012", with English translation of claims, 11 pgs.

"Chinese Application Serial No. 200780023041.0, Response filed Mar. 1, 2013 to Office Action mailed Dec. 8, 2012", with English translation of claims, 5 pgs.

"Chinese Application Serial No. 200780023041.0, Response filed Apr. 25, 2011 to Office Action mailed Dec. 14, 2010", with English translation of claims, 13 pgs.

"Chinese Application Serial No. 200780023041.0, Response filed Jun. 21, 2012 to Office Action mailed Apr. 6, 2012", with English translation of claims, 15 pgs.

"Chinese Application Serial No. 200780023041.0, Response filed Aug. 3, 2011 to Office Action mailed May 25, 2011", with English translation of claims, 4 pgs.

"European Application Serial No. 07812999.6, Extended Search Report Report mailed Mar. 15, 2013", 8 pgs.

"Fibre Channel—Physical and Signaling Interface (FC-PH)—Rev 4.3", Published by American National Standards Institute, Proposed Working Draft, American National Standard for Informations Systems, (Jun. 1, 1994), 478 pgs.

"IEEE Standard for Ethernet, IEEE Std. 802.3™ -2012, Section 1", The Institute of Electrical and Electronics Engineers, Inc., (Dec. 28, 2012), 634 pgs.

"IEEE Standard for Ethernet, IEEE Std. 802.3™ -2012, Section 2", The Institute of Electrical and Electronics Engineers, Inc., (Dec. 28, 2012), 780 pgs.

"IEEE Standard for Ethernet, IEEE Std. 802.3™ -2012, Section 3", The Institute of Electrical and Electronics Engineers, Inc, (Dec. 28, 2012), 358 pgs.

"IEEE Standard for Ethernet, IEEE Std. 802.3™ -2012, Section 4", The Institute of Electrical and Electronics Engineers, Inc., (Dec. 28, 2012), 732 pgs.

"IEEE Standard for Ethernet, IEEE Std. 802.3™ -2012, Section 5", The Institute of Electrical and Electronics Engineers, Inc., (Dec. 28, 2012), 844 pgs.

"IEEE Standard for Ethernet, IEEE Std. 802.3™ -2012, Section 6", The Institute of Electrical and Electronics Engineers, Inc, (Dec. 28, 2012), 400 pgs.

"IEEE Standard for Information technology—Telecommunication and Information exchange between systems—Local and metropolitan area networks—Specific requirements", (Jan. 1, 2005), 1,2,153-176.

"Intel 82540EP Gigabit Ethernet Controller, Networking Silicon", Datasheet, Revision 1.5, (Nov. 2004), 46 pgs.

"International Application Serial No. PCT/US2007/073655, International Preliminary Report on Patentability mailed Jan. 27, 2009", 5 pgs.

"International Application Serial No. PCT/US2007/073655, Written Opinion mailed Feb. 1, 2008", 4 pgs.

"Telecommunications and information exchange between systems, local and metropolitan networks, Specific Requirements, Part 3: Carrier Sense multiple access with collision detection (CSMA/CD) access method and physical layer specifications", IEEE Standard for Information Technology, IEEE New York, NY, IEEE Std 802.3 2005 (Revision of IEEE Std. 802.3-2002), (Dec. 12, 2005), 26 pgs.

Brand, Richard, "10 Gigabit Ethernet Interconnection with Wide Area Networks", Version 1, www.10gea.org, (Mar. 2002), 6 pgs.

Frazier, Howard, "Comparison of Rate Control Methods", IEEE P802.3ae 10 Gigabit Ethernet Task Force, (May 24, 2000), 1-15.

Muller, S., et al., "Proposal for an Open Loop PHY Rate Control Mechanism", Presentation, IEEE 802.3ae 10Gb/s Task Force,Interim meeting, Ottawa, ON, (May 2000), 11 pgs.

Zeile, M., "An Efficient Interconnect for Advanced Mezzanine Cards", Fulcrum Microsystems, www.fulcrummicro.com, (Oct. 2004), 3 pgs.

International Search Report and Written Opinion, dated Jun. 25, 2014, received in connection with corresponding International Application No. PCT/US2014/024819.

\* cited by examiner

US 9,160,604 B2

SYSTEMS AND METHODS TO EXPLICITLY REALIGN PACKETS

TECHNICAL FIELD

This disclosure relates to the technical field of data communications and, more particularly, to systems and methods to explicitly realign packets.

RELATED ART

An interface standard may define the characteristics of a transmission of a stream of bytes over an interface. For example, one interface standard defines a transmission that is performed by a predetermined number of transport channels (e.g., lanes) that transport the individual bytes of the stream of bytes, in parallel, responsive to an electronic pulse of a clock. Further, the interface standard may include an alignment restriction (e.g., rule) that restricts a standard part (e.g., byte in start of packet position) of a standard data unit of data (e.g., packer) to a particular transport channel (e.g., lane "0" of "4" lanes) or timeslot. Imposition of the alignment restriction is associated with benefits. Nevertheless, such an approach is now recognized as further being associated with deficiencies.

BRIEF DESCRIPTION OF THE DRAWINGS

Embodiments illustrated by way of example and not limitation in the figures of the accompanying drawings, in which.

DETAILED DESCRIPTION

In the following description, for purposes of explanation, numerous specific details are set forth in order to provide a thorough understanding of some example embodiments. It will be evident, however, to one of ordinary skill in the art, that embodiments of the present disclosure may be practiced without these specific details.

As described further below, according to various example embodiments of the disclosed subject matter described and claimed herein, systems and methods to explicitly realign packets are described. Various embodiments are described below in connection with the figures provided herein.

Figure 1A:
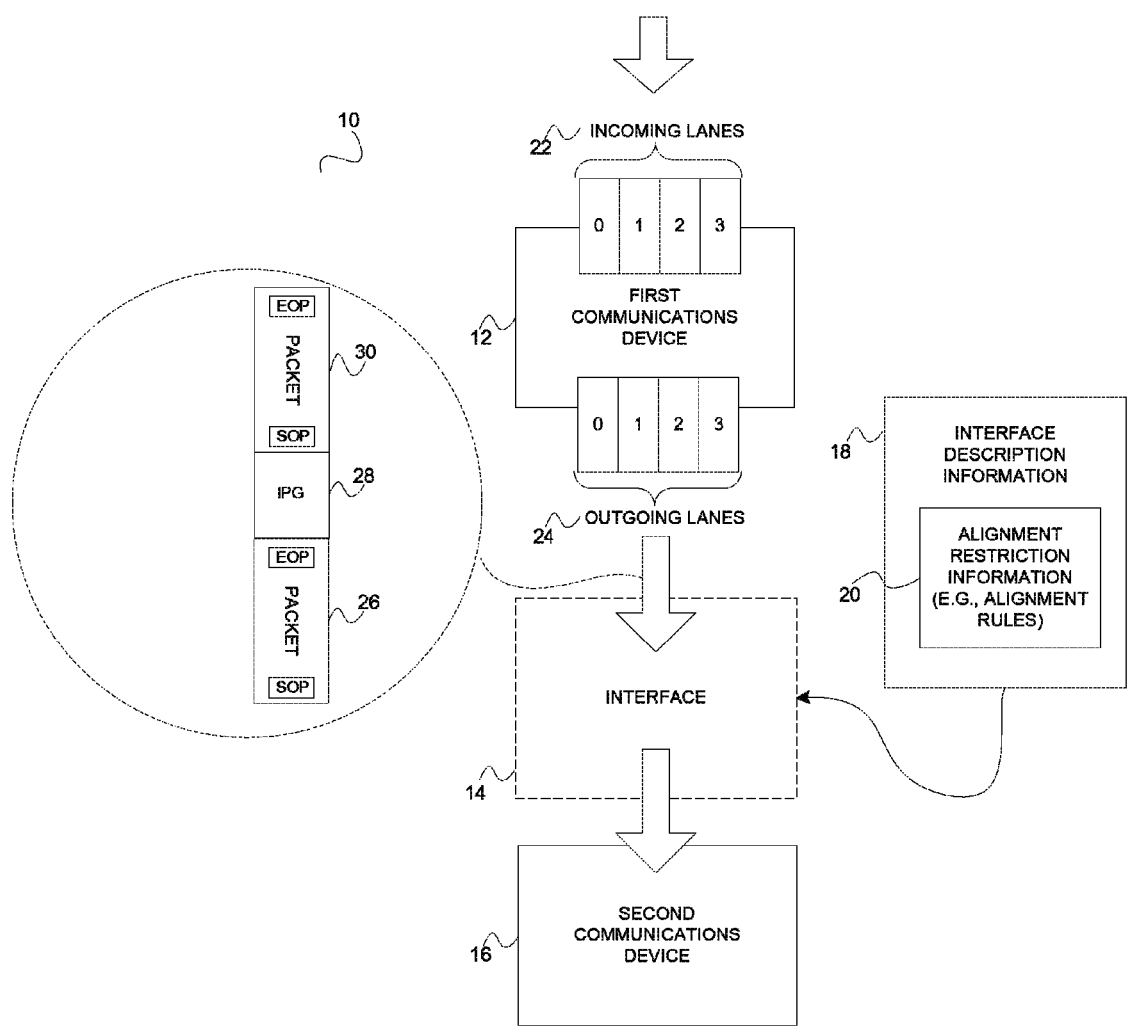
FIG. 1A is a block diagram illustrating a system, according to an embodiment, to align packets.

FIG. 1A is a block diagram illustrating a system 10, according to an embodiment, to align packets. The system 10 is used to illustrate a deficiency. The system 10 may include a first communications device 12 (e.g., integrated circuit) that communicates a data stream (e.g., stream of bytes) over an interface 14 (e.g., electrical connector) to a second communications device 16 (e.g., integrated circuit) The interface 14 may be associated with an interface standard in the form of interface description information 18 (e.g., IEEE specification 802.3™ 2012) that specifies communication of the data stream over the interface 14. For example, the interface description information 18 may specify the data stream be transmitted at a predetermined speed (e.g., bits per standard unit of time) (e.g., ten gigabits per second) over a predetermined number of transport channels (e.g., lanes) that transport individual bytes of the data stream in parallel in response to an electronic pulse of a clock. Further, the interface description information 18 may specify the data stream be transmitted in data units that are characterized with a standard format and standard parts. For example, the data unit may include a packet with a standard format that is characterized with a variable length (e.g., bytes) and standard parts including a start of packet part in the form of a first predetermined control information (e.g., byte) in a start of packet (SOP) position of the packet and an end of packet part in the form of a second predetermined control information (e.g., byte) in an end of packet (EOP) position of the packet. The interface description information 18 may further specify a silence restriction associated with a communication of a data unit over the interface 14. For example, the silence restriction may be honoured by inserting a predetermined quantity of predetermined control information before and after each standard data unit, in one example, the control information that is inserted may be characterized as a gap (e.g., inter-packet gap (IPG) which is characterized by a predetermined quantity (e.g., twelve bytes) of predetermined control information (e.g., idle codes) between each standard unit of data (e.g., packet). Finally, the interface description information 18 may include an alignment restriction in the form of alignment restriction information 20 (e.g., alignment rules) that restrict receipt of a standard part of the standard data unit to a particular transport channel (e.g., lane 0). For example, the interface description information 18 may restrict a byte in the SOP position of a packet to lane "0" of the interface 14. A deficiency of the system 10 is now illustrated.

The first communications device 12 may include incoming lanes 22 that are identified as lanes 0, 1, 2 and 3 and outgoing lanes 24 identified as lanes 0, 1, 2 and 3. The incoming lanes 22 may be utilized by the first communications device 12 to receive four bytes of a data stream responsive to an electronic pulse of a clock and the outgoing lanes 24 may be utilized by the first communications device 12 to transmit four bytes of the data stream over the interface 14 responsive to an electronic pulse of a clock. The transmission of the data stream over the interface 14 may be limited according to the example interface description information 18 described above (e.g., speed of ten gigabits per second, four parallel lanes, variable length packets, SOP byte, EOP byte, packets being separated with an IPG of at least twelve bytes of predetermined control information, the SOP byte being restricted to lane "0").

Assume the first communications device 12 receives a packet 26 that ends with an EOP byte on lane "1" of the incoming lanes 22 and transmits the same packet 26 with the EOP byte on lane "1" of the outgoing lanes 24. The first communications device 12 may now insert a 12-byte IPG 28 on the outgoing lanes 24 as follows 2,3,0,1,2,3,0,1,2,3,0,1, with the next byte in the SOP position appearing on lane 2. The alignment restriction prohibits a SOP byte on lane 2. Accordingly, the first communications device 12 may lengthen or shorten the IPG 28 by two bytes before inserting the SOP onto lane 0. That is, the first communications device 12 may shorten the IPG 28 by two bytes to force alignment of the packet 30 on lane "0" of the outgoing lanes 24 or lengthen the IPG 28 by two bytes to force alignment of the packet 30 on lane "0" of the outgoing lanes 24.

It will be appreciated by those skilled in the art that the above described alignment restriction is associated with benefits and deficiencies. For example, alignment restriction may result in simplification of internal circuitry of the first communications device 12, the interface 14 and the second communications device 16. The simplification of the internal circuitry may further enhance the robustness of the internal circuitry of the three devices. On the other hand, one unintended deficiency of the system 10 is an alteration of the timing of the packet 30. For example, the first communications device 12 does not transmit the packet 30 on the outgoing lanes 24 as it was received on the incoming lanes 22. Rather, the first communications device 12 aligns and transmits the packet 30 either two bytes ahead of the packet 30, as received on the incoming lanes 22 at the first communications device 12, or two bytes behind the packet 30, as received on the incoming lanes 22 at the first communications device 12. The movement of the packet 30 both up and down the stream of bytes may also be understood as a degradation of timing. That is, the first communications device 12 aligns and transmits the packet 30 either two byte times ahead (e.g., earlier in time) of the packet 30, as received on the incoming lanes 22 at the first communications device 12, or two byte times behind (e.g., later in time) the packet 30, as received on the incoming lanes 22 at the first communications device 12.

Reference is now made in detail to various embodiments of the disclosure. Examples of these embodiments are illustrated in the accompanying drawings. While the disclosure will be described in conjunction with these embodiments, it will be understood that they are not intended to limit the disclosure to any particular embodiments. On the contrary, they are intended to cover alternatives, modifications, and equivalents as may be included within the spirit and scope of the disclosure as defined by the appended claims. In the following description, numerous specific details are set forth in order to provide a thorough understanding of the present disclosure. The present disclosure may be practiced without some or all of these specific details. In other instances, well known process operations have not been described in detail in order not to unnecessarily obscure the present disclosure.

According to a first aspect of the present disclosure, a system may include a first communications device 12 that receives a first stream of bytes comprising a first packet including multiple bytes. The multiple bytes may further include a first byte that is located in a start of packet position of the packet. Responsive to receiving the packet, the first communications device 12 may align the packet relative to the first stream of bytes to generate a second stream of bytes and generate realignment information. The alignment of the first packet relative to the first stream of bytes may be based on an alignment restriction that is associated with an interface 14 (e.g., data path). For example, the alignment restriction may restrict communication of the first byte of the packet (SOP) to a particular lane. Consider a data path that is four lanes wide and used to communicate, in parallel, four bytes of the packet from the first communications device 12 to a data path responsive to the pulse of a clock signal. For example, the alignment restriction may restrict communication of the first byte of the packet to lane "0". The realignment information may be a recordation of the movement of the packet up the first stream of bytes or down the first stream of bytes to generate the second stream of bytes in satisfaction of the alignment restriction. After the alignment of the packet and the generation of the realignment information, the communications device may transmit the second stream of bytes over the data path where the second stream of bytes includes the realignment information and the first packet that is now aligned for transmission over lane "0".

According to a second aspect of the present disclosure the system 10 may further include a second communications device 16 that receives the second stream of bytes including the first packet and the realignment information. The second communications device 16 may retrieve the realignment information from the second stream of bytes and realign the first packet in the second stream of bytes based on the realignment information to regenerate the first stream of bytes. Accordingly, the realignment information enables the second communications device 16 to regenerate the first stream of bytes as received by the first communications device 12.

It will be appreciated, by those skilled in the art that the above described alignment and realignment are associated with benefits. For example, alignment continues to enable a simplification of internal circuitry of the first, second and any intervening communications devices to enhance their robustness. Further, realignment enables the second communication device 16 to regenerate the first stream of bytes which preserves the timing of the packet relative to the first byte stream as received by the first communications device 12.

Figure 1B:
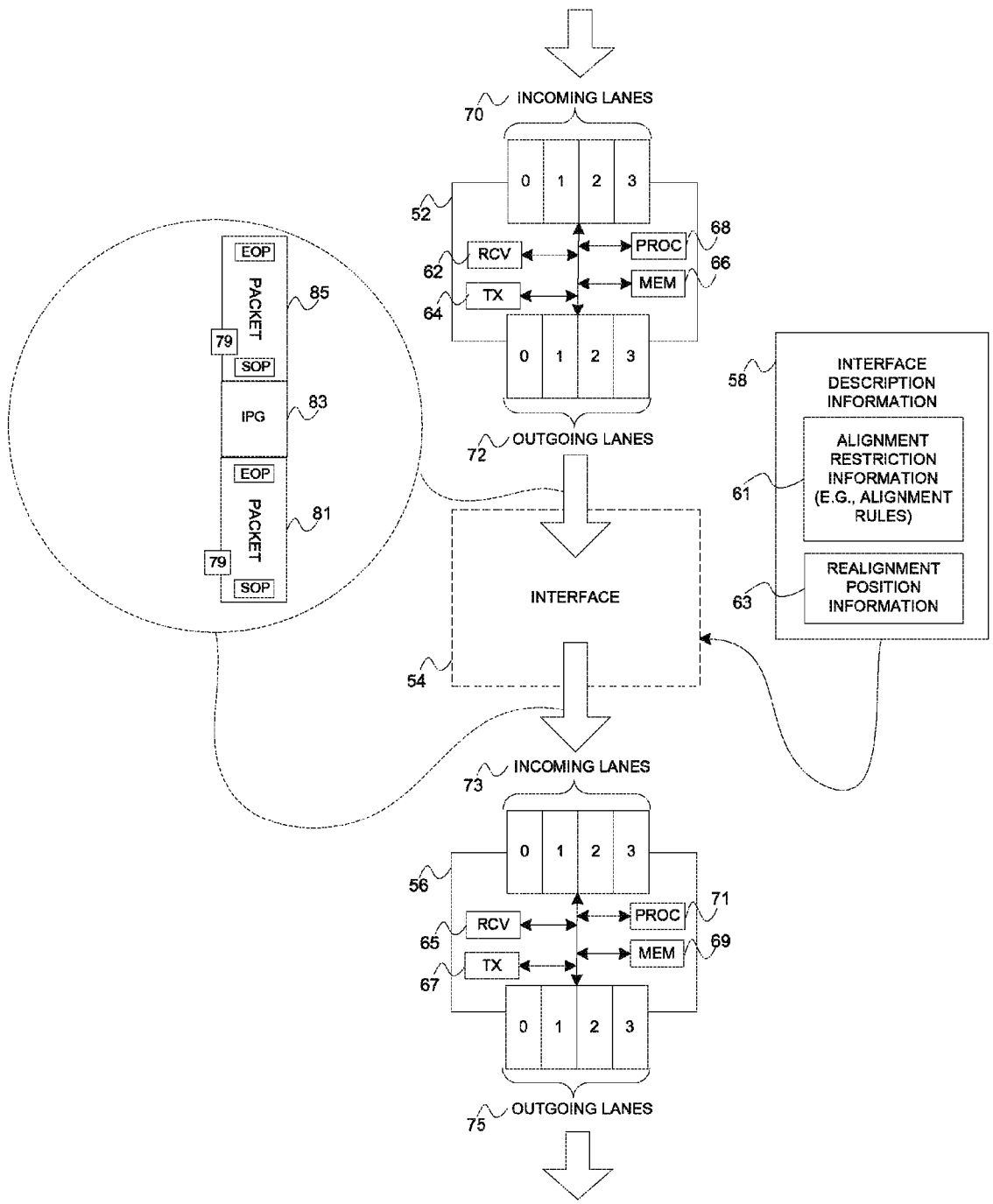
FIG. 1B is a block diagram illustrating a system, according to an embodiment, to align and realign packets.

FIG. 1B is a block diagram illustrating a system 50, according to an embodiment, to explicitly realign packets. The system 50 may include a first communications device 52 (e.g., integrated circuit) that communicates a data stream (e.g., stream of bytes) over an interface 54 (e.g., electrical connector) to a second communications device 56 (e.g., integrated circuit). The interface 54 may be associated with interface description information 58 (e.g., IEEE specification 802.3™ 2012) that specifies communication of the data stream over the interface 54. The interface description information 58 may include alignment restriction information 61, realignment position information 63, and other information, as previously described.

The first communications device 52 may include a receiver 62, a transmitter 64, memory 66, a processor 68, incoming lanes 70 and outgoing lanes 72. Broadly, the receiver 62 may receive the data stream (e.g., first data stream) on incoming lanes 70 that are identified as lanes 0, 1, 2 and 3 and the transmitter 64 may communicate the data stream e.g., second data stream) on the outgoing lanes 72 identified as lanes "0," "1," "2" and "3." The receiver 62 and/or the transmitter 64 may utilize the memory 66 to process the data stream. For example, the receiver 62 and/or the transmitter 64 may utilize the memory 66 to insert an IPG, align a packet to a data stream to satisfy the alignment restriction, or realign a packet to a data stream based on realignment information 79.

The second communications device 56 may also include a receiver 65, a transmitter 67, memory 69, a processor 71, incoming lanes 73 and outgoing lanes 75. Broadly, at the second communications device 56, the receiver 65 may receive the data stream (e.g., second data stream) on incoming lanes 73 that are identified as lanes "0,"1," "2" and "3" and the transmitter 67 may communicate the data stream (e.g., first data stream) on outgoing lanes 75 (may have no alignment restrictions, or less stringent restrictions) identified as lanes "0," "1," "2" and "3." Again, the receiver 65 and the transmitter 67 may utilize the memory 69 to process the data stream. For example, the receiver 65 and/or the transmitter 67 may utilize the memory 69 to insert an IPG, align a packet to a data stream to satisfy the alignment restriction, or realign a packet to a data stream based on realignment information 79. The transmission of the data stream over the interface 54 may be limited according to the example interface description information 58 described above and further according to the realignment position information 63, described below.

The system 50 is illustrated as communicating data in a single direction from top to bottom but nevertheless operates full duplex such that alignment and realignment are capable of being performed in both directions. For example, the illustrated receivers 62, 65 and the transmitters 64, 67 may further process a stream of bytes that is incoming from the bottom of the FIG. 1B and outgoing from the top of FIG. 1B. For example, such processing may be performed with additional incoming and outgoing lanes (not shown).

A system and method for aligning and realigning a packet is now described. Assume a packet 81 ends with an EOP byte on lane "1" of the incoming lanes 70 (e.g., first stream) of the first communications device 52 and is transmitted on the same lane of the outgoing lanes 72 (e.g., second stream) of the first communications device 52. The transmitter 64 of the first communications device 52 may now store a 12-byte IPG 83 in a buffer for transmission on the outgoing lanes 72 as follows 2,3,0,1,2,3,0,1,2,3,0,1, with the next byte in the SOP position appearing on lane "2," The alignment restriction associated with the interface 54 prohibits a SOP byte of a packet 85 on lane "2," Accordingly, the transmitter 64 at the first communications device 52 may shorten or lengthen the IPG 83 in a first in first out FIFO buffer by two bytes to ensure the first byte of the packet (e.g., SOP) is transmitted in lane "0." Next, the transmitter 64 may align the packet 81 in the FIFO buffer immediately adjacent to the 10-byte IPG (e.g., SOP communicated onto lane "0") to generate the second stream in satisfaction of the alignment restriction. Finally, the transmitter 64 may generate realignment information 79 based on the alignment of the packet (e.g., +2 or −2), store the realignment information 79 at a predetermined location in the second stream (e.g., buffer), and communicate the second stream to the second communications device 56.

The realignment information 79 records a difference between a time that a first byte of the first packet would have been communicated by the first communications device 52 (e.g., time=0) on the interface 72 (in the absence of an alignment restriction) and an actual time of transmission of the first byte of the first packet by the first communications device 52 in accordance with the alignment restriction associated with the interface 54 (e.g., +2 or −2) (e.g., corresponds to a lengthening or shortening of the IPG 83 by two bytes). Further, the realignment information 79 may be stored in the IPG 83 before the packet 85 or the IPG after the packet 85 (not shown) or in various locations in the packet 85 that is aligned. In some embodiments the realignment information 79 may be stored in a location in accordance with the realignment position information 63 specified in the interface description information 58. In another embodiment, the realignment information 79 may be stored in a location in accordance with a configurable value.

Responsive to receipt of the data stream (e.g., second stream), at receiver 65 of the second communications device 56, the transmitter 67 may retrieve the realignment information 79 from the data stream, realign the packet 85 based on the realignment information 79 to regenerate the data stream (e.g., first stream) that was received by the first communications device 52, and transmit the data stream out the outgoing lanes 75.

In another embodiment the number of transport channels (e.g., incoming lanes 70, 73 and/or outgoing lanes 72, 75) may be fewer or greater and/or a number of lanes per transport channel may be fewer or greater and/or the alignment restrictions may be different, if there are any. In another embodiment a data unit other than a packet may be utilized. In another embodiment a standard part of the packet other than the first byte of the packet (SOP) may be utilized for alignment. In another embodiment, the first byte of the packet (SOP) may align to a different lane (e.g., internal lane, end lane). In another embodiment, the first communications device 52 may be configured to receive multiple data streams that are multiplexed together and communicated over the interface 54 as a single data stream to the second communications device 56 which de-multiplexes the data stream into the multiple data streams. A particular stream may be identified from the multiple streams with a stream identifier. According to this embodiment, the explicit realignment of packets described above may be independently performed for each of the multiple data streams based on data stream identifiers that identify the respective data streams and their associated realignment information 79. In another embodiment the interface 54 may perform the realignment operation based on the realignment information 79.

Figure 2:
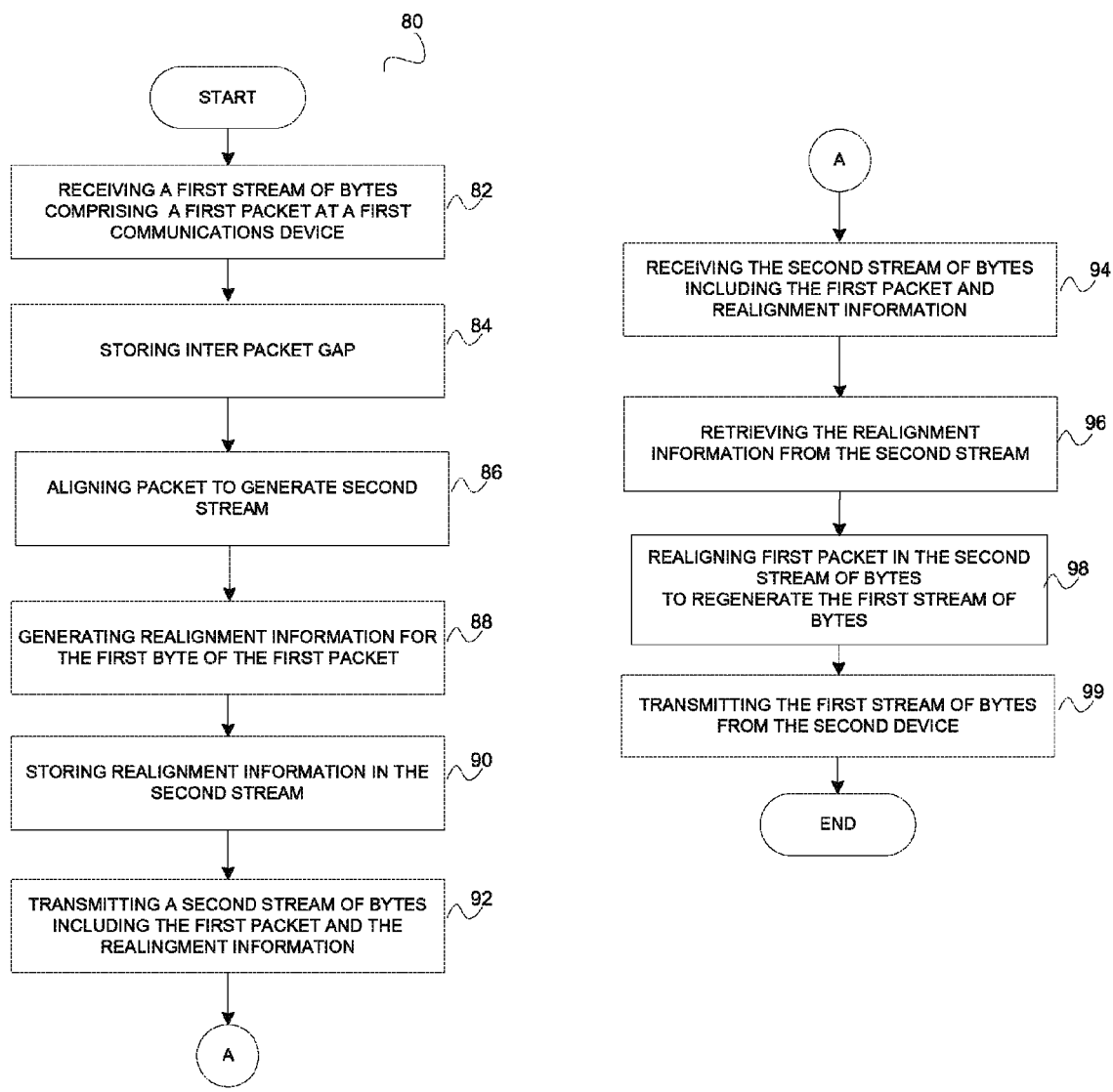
FIG. 2 is a flow chart illustrating a method, according to an embodiment, to explicitly realign packets.

FIG. 2 is a flow chart illustrating a method 80, according to an embodiment, to explicitly realign packets. The method 80 may describe operations for a first communications device 52 (e.g., integrated circuit) to communicate a data stream (e.g., stream of bytes) over an interface 54 (e.g., electrical connector) to a second communications device 56 (e.g., integrated circuit) in accordance with interface description information 58 (e.g., IEEE specification 802.3™ 2012) that includes alignment restriction information 61 restricting a first byte of a packet to lane "0" of a four lane interface 54 and realignment position information 63 that predetermines storage of the realignment information 79 in the preamble of the aligned packet.

The method 80 may commence at operation 82 with a receiver 62, at a first communications device 52, receiving a first stream of bytes. The first stream of bytes may include a packet 81 followed by a packet 85. The receiver 62 may identify the packet 81 as ending with an EOP byte on lane two of the incoming lanes 70 of the first communications device 52. The incoming lanes 70 may be identified as lane "0," "1," "2," and "3." which are matched with outgoing lanes 72 similarly identified. The receiver 62 may store the first stream in memory 66 in a FIFO buffer to prepare the first data stream for transmission as a second data stream.

At operation 84, a transmitter 64, in the first communications device 52, may store an IPG in the FIFO buffer after the packet 81 in anticipation of aligning the first byte of the first packet in accordance with the alignment restriction. For example, the transmitter 64 may insert a 10-byte IPG 83 in the buffer for subsequent transmission on the outgoing lanes 72 as follows 2,3,0,1,2,3,0,1,2,3, reserving the first byte of the packet 85 for the SOP position (e.g., lane "0"). It will be appreciated that another embodiment may insert a 14-byte IPG 83 in the FIFO buffer for subsequent transmission on the outgoing lanes 72 as follows 2,3,0,1,2,3,0,1,2,3,0,1,2,3, also reserving the first byte of the packet 85 for the SOP position (e.g., lane "0").

At operation 86, at the first communications device 52, the transmitter 64 may align the packet 85 in the FIFO buffer immediately adjacent to the 10-byte IPG (e.g., SOP communicated onto lane "0") to generate the second stream. For example, the transmitter 64 may shift the packet 85 earlier by two byte times.

At operation 88, at the first communications device 52, the transmitter 64 may generate realignment information 79 of minus two for the first byte of the packet 85. Realignment information 79 (e.g., minus two) represents a difference between a time that the first byte of the packet 85 would have been transmitted by the first communications device 52 (e.g., time=0) on the interface 54 in the absence of alignment restrictions and a time that it was transmitted by the first communications device 52 in accordance with the alignment restriction associated with the interface 54 (e.g., alignment rule—SOP byte restricted to lane "0").

At operation 90, at the first communications device 52, the transmitter 64 may store the realignment information 79 in the packet 85 in the FIFO buffer in accordance with the realignment position information 63. For example, the transmitter 64 may store the realignment information 79 in the preamble of the packet 85. Other embodiments may store the realignment information 79 in one of the contiguous IPGs or some other part of the packet 85, or by changing realignment information 79 in packet 85.

At operation 92, at the first communications device 52, the transmitter 64 may transmit the second data stream over the data path (e.g., interface) to the second communications device 56. The second data stream may include the packet 85 and the realignment information 79.

At operation 94, at the second communications device 56, the receiver 65 may receive the second data stream from the interface 54 (e.g., data path). At operation 96, at the second communications device 56, the receiver 65 may store the first stream in memory 69 in a FIFO buffer.

At operation 96, at the second communications device 56, the transmitter 67 may retrieve the realignment information 79 from the data stream. For example, the transmitter 64 may utilize the realignment position information 63 to identify the location of the realignment information 79 in the preamble of the packet 85.

At operation 98, at the second communications device 56, the transmitter 67 may realign the packet 85 in the second data stream to generate the first data stream. For example, the transmitter 67 may realign the packet 85 in the second data stream based on the realignment position information 63 to shift the packet 85 two byte times to the right (e.g., forward in time) to generate the first data stream.

At operation 99, at the second communications device 56, the transmitter 67 may transmit the first data stream over the outgoing lanes 72.

In computer network systems there is typically a natural division between chips handling the physical layer, which is designed for transmitting data on the network, and the system chips, which perform logical operations with data transmitted on the network. Ethernet hubs, routers and switches are composed of multiple ports, and may be generically referred to as multi-port Ethernet devices. Each port is typically composed of a system chip, which includes a media access controller ("MAC") layer, and a physical layer or "PHY." Modern multi-port Ethernet devices typically integrate multiple MACs into one system chip (MAC chip) as well as multiple PHYs into another chip (PRY chip). An interface 54 is specified on each chip to transfer signals between the MACs and the PHYs.

IEEE Standard for Information technology—Telecommunications and information exchange between systems—Local and metropolitan area networks—Specific specifications, Part 3: Standard for Ethernet, IEEE Std 802.3™-2012, provides a standard for Ethernet local area network operation including interfaces between the MACs and the PHYs.

Section 4 of IEEE Std 802.3™-2012 provides for a 10 Gigabit/second (Gb/s) baseband network and connection of a 10 Gb/s capable MAC to a 10 Gb/s PHY. Interfaces that can connect a 10 Gb/s capable MAC device to a 10 Gb/s PHY device include 10 Gigabit Media Independent Interface (XGMII), 10 Gigabit Attachment Unit Interface (XAUI), 10 Gigabit Sixteen-Bit Interface (XSBI), and the high speed serial electrical interface for 10 Gb/s small form-factor pluggable transceiver (XFP) modules (XFI and SFI).

Figure 3B:
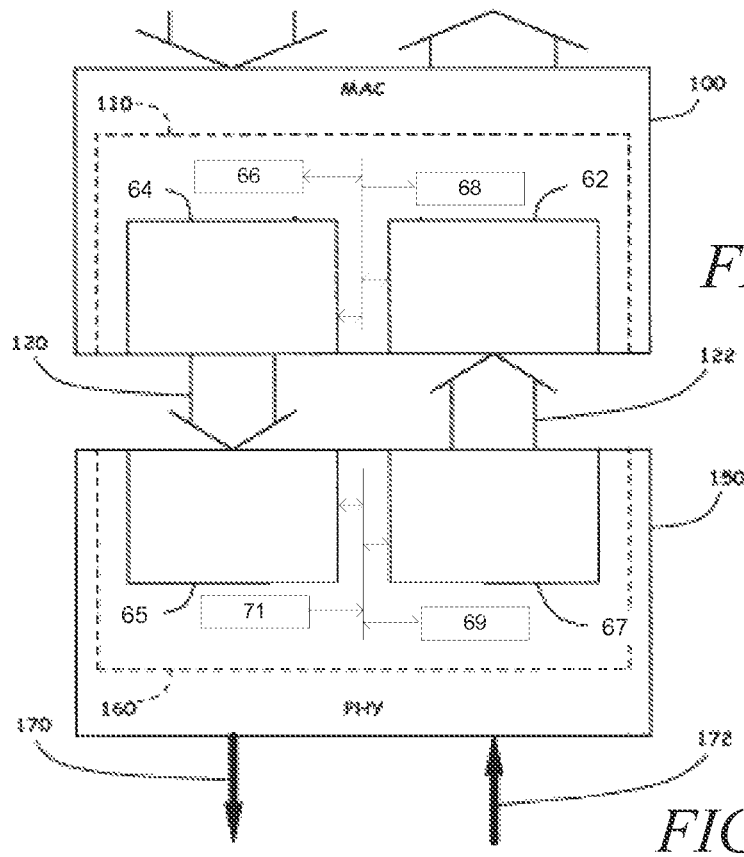
FIG. 3B is a block diagram of an interface, according to an embodiment, of a MAC to PHY in relation to the OSI Reference Model Layers.
Figure 3A:
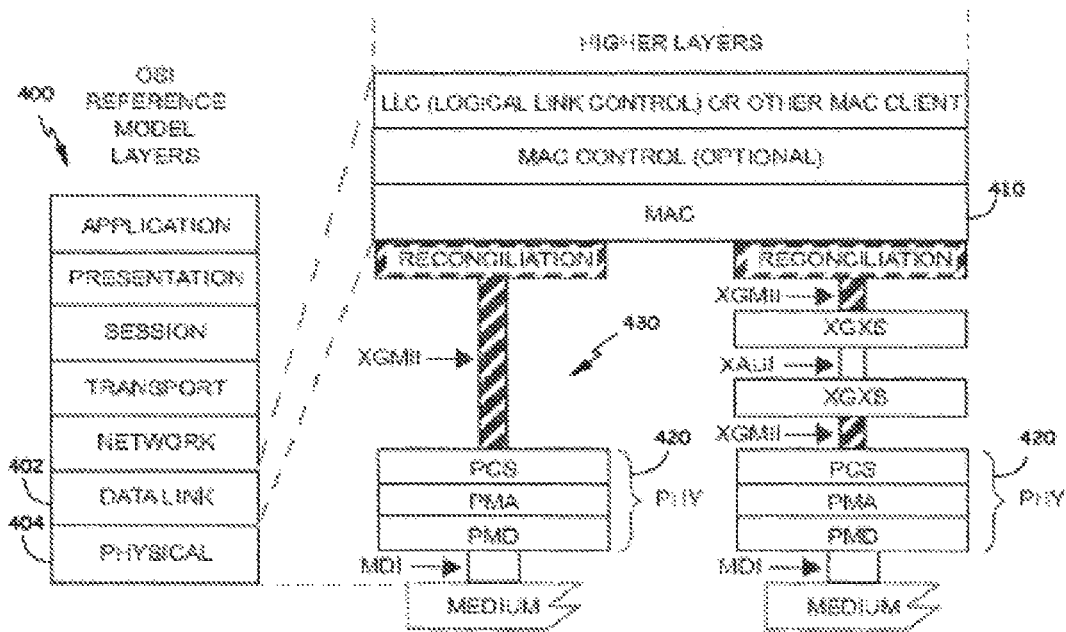
FIG. 3A is a block diagram of an interface, according to an embodiment, of a media access control (MAC) layer to a physical access control (PHY) layer.

FIG. 3A is a block diagram illustrating a media access control layer 410 to physical access control layer 420 interface according to IEEE Std 802.3™-2012 in relation to the OSI Reference Model Layers 400. The media access control layer 410 is part of the data link layer 402. The physical access control layer 420 is part of the physical layer 404. The interface 430 between the media access control layer 410 and the physical access control layer 420 is also part of the physical layer 404.

Various 10 Gigabit/second interfaces may be used between the media access control layer 410 and the physical access control layer 420. For example, a 10 Gigabit Interface Media independent Interface (XGMII) in which each sixty-four bit block consists of two consecutive sets of thirty-two data bits with a corresponding four bits of controls may be used. The thirty-two data bits and four control bits are communicated over four lanes in which each of the lanes carries an octet of data and an associated control bit. Four lanes (not shown) are provided for data to be transmitted on the attached media. An independent four lanes (not shown) are provided for data received on the attached media.

Another interface that may be used between the media access control layer 410 and the physical access control layer 420 is a 10 Gigabit Attachment Unit Interface (XAUI) in which each sixty-four bit block consists of two consecutive sets of four 8B/10B codewords, eight bits of data encoded into a ten bit codeword.

Still another interface that may be used between the media access control layer 410 and the physical access control layer 420 is a high speed serial electrical interface for 10 Gb/s small form-factor pluggable transceiver (XFP) modules (XFI and SFI) in which each sixty-four bit block consists of one 64B/66B codeword, sixty-four bits of data encoded into a sixty-six bit codeword. The alignment restriction restricts communication of the first byte of the packet to byte "0" or byte "4" of the eight bytes n the codeword. 10 Gb/s communication between the media access control layer 410 and the physical access control layer 420 is specified as operating at a fixed clock frequency corresponding to the nominal ten Gb/s bit rate.

Independent transmit and receive data paths are provided between the media access control layer 410 and the physical access control layer 420. Data is communicated in data frames/packets that begin with a preamble (preamble) and start of frame/packet delimiter (SOP) and end with an end of frame/packet delimiter (EOP). Data within each data frame/packet is communicated in sixty-four bit code blocks. An inter-frame <inter-frame> period during which no frame data activity occurs separates successive data frames. The IPG may vary in length, however, the standard IPG minimum is twelve bytes of predetermined control information.

FIG. 3B is block diagram of a device 110 for transmitting data between a media access controller (MAC) 100 and a physical layer (PHY) 150. The 110 device includes a transmitter 64, a receiver 62, a memory 66, a processor 68, incoming lanes (not shown) and outgoing lanes (not shown). The transmitter 64 may transmit a data frame/packet on a first 10 Gigabit/second data path 120 between the MAC 100 and the PHY 150. The term 10 Gigabit/second data path is used herein to mean a data path that is compliant with IEEE Std 802.3™-2012. Such a 10 Gigabit/second data path 120 may be provided by a 10 Gigabit Interface Media Independent Interface (XGMII), a 10 Gigabit Attachment Unit Interface (XAUI), a high speed serial electrical interface for 10 Gb/s small form-factor pluggable transceiver (XFP) modules (XFI or SFI), and by other interfaces that are compliant with IEEE Std 802.3™-2012. It is a requirement of IEEE Std 802.3™-2012 that the data interfaces operate at a fixed clock frequency corresponding to the nominal 10 Gb/s bit rate, where the exact clock frequencies are a function of the interfaces as provided by the standard.

The device 160 and the device 110 may be utilized to perform the methods to explicitly align packets, as previously described. More specifically, the first communications device 52, as previously described, may be embodied as the device 110 to explicitly realign packets. Further, the second communications device 56, as previously described, may be embodied as the device 160 to explicitly realign packets.

It will be appreciated that the MAC 100 and PHY 150 form a symmetrical system in which the PHY 150 may use a device 160 that is similar to the device 110 used by the PHY 150 to transmit data. Further, it may be noted that the data flowing through the MAC 100 and the PHY 150 may be described as transmit data or receive data based on whether it is transmitted or received on the media connected to the PHY 150. Accordingly, the transmitter 64 of the MAC 100 may be utilized to communicate transmit data that is received by the receiver 65 of the PHY 150 for transmission on the outbound media 170. The inbound media 172 provides receive data that the transmitter 67 of the PHY 150 transfers to the receiver 62 of the MAC 100. The device 110 may further include a receiver 62 coupled to the transmitter 64 and to a second 10 Gigabit/second data path 122 between the MAC 100 and the PHY 150. The second data path 122 transfers data in an opposite direction from the first data path 120.

For the MAC 100, the first data path 120 carries the transmit data destined for the outbound media 170 and the second data path 122 carries the receive data from the inbound media 172. For the PEW 150, the first data path 122 carries the receive data from the inbound media 172 and the second data path 120 carries the transmit data destined for the outbound media 170. Note that the term first data path and second data path are applied with respect to the transmitter 64 and receiver 62 respectively of the device being described. The first data path 120 for the device 110 on the MAC 100 is also the second data path 120 for the device 160 on the PHY 150.

A stream identifier may be utilized to identify a particular stream from a plurality of streams. The stream identifier may be associated with a bandwidth factor. It may be noted that a bandwidth factor of 0 means that a single stream uses all available bandwidth to provide a 10 Gb/s stream. The stream identifier may be ignored for a single stream. When the available bandwidth is divided into multiple streams by stream identifier blocks, each stream represents an independent data transmission. Each stream will have data frames and interframe periods that are not aligned with other streams.

Virtual Realignment

In another embodiment, an arrival time of a packet may be identified and adjusted based on realignment information to virtually realign the packet. Merely for example, an arrival time, that chronicles an arrival of a first packet at a second communications device, may be identified and stored in memory. The second communications device may subsequently retrieve the arrival time to virtually realign the packet based on realignment information that is received with the packet in a second packet stream, as described above. For example, the second communications device may virtually realign the packet by subtracting the realignment information from the arrival time to generate a virtual arrival time. Accordingly, in the present embodiment, the second communications device does not alter the second packet stream in which the first packet is received; but rather, the arrival time of the second packet at the second communications device to generate a virtual arrival time, namely, the arrival time that would have been realized without the first communications device aligning the first packet in, conformance with an alignment rule.

Figure 4:
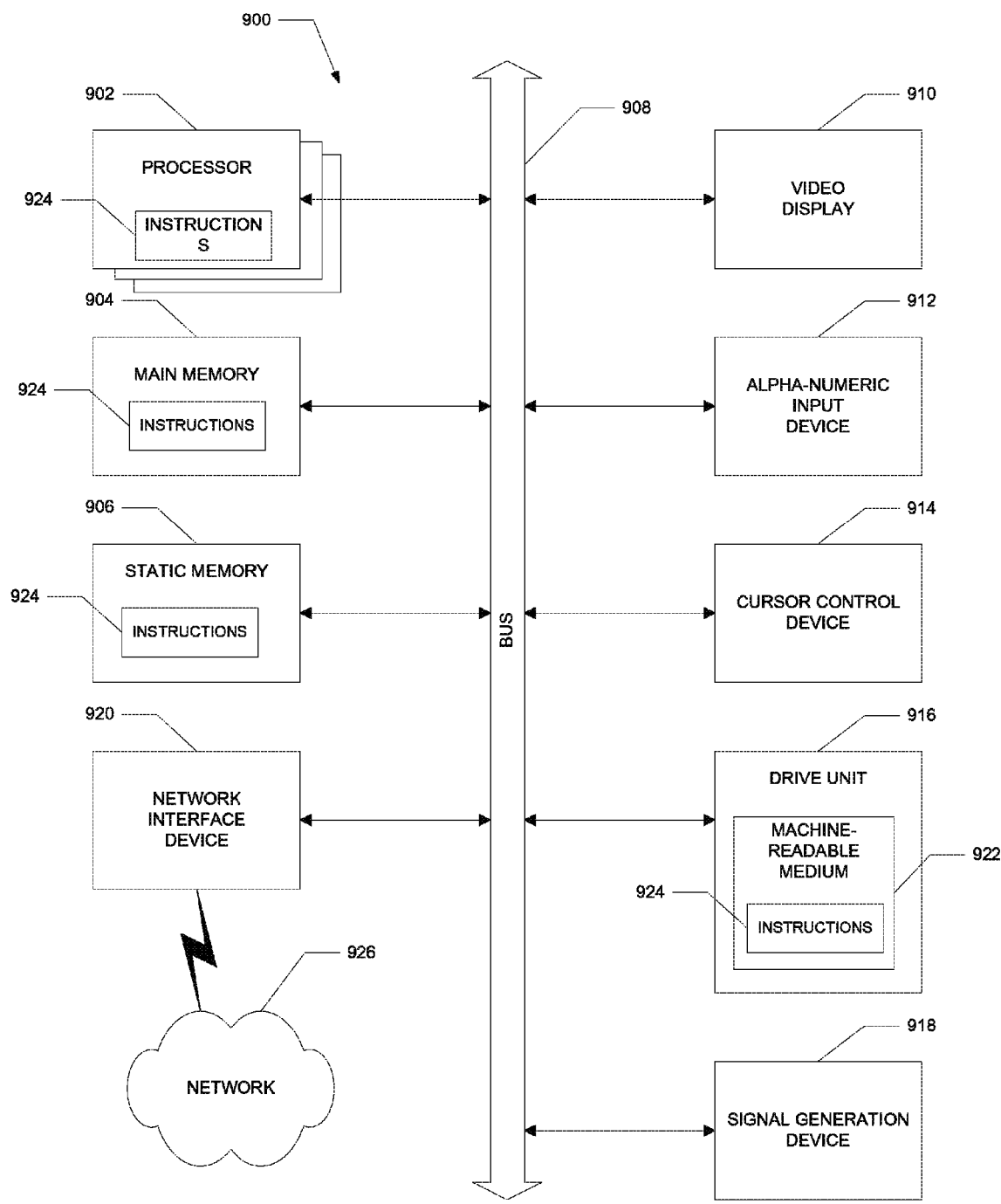
FIG. 4 is a block diagram of a machine, according to an embodiment.

FIG. 4 shows a diagrammatic representation of a machine in the example form of a computer system 900 within which a set of instructions may be executed for causing the machine to perform any one or more of the methodologies discussed herein or for communicating the set of instructions to a remote machine for causing the remote machine to perform any one or more of the methodologies discussed herein. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a communications device, a device for transmitting or receiving data, a server computer, a client computer, a personal computer (PC), a tablet PC, a set-top box (STB), a personal digital assistant PDA, a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes one or more processors 902 (e.g., a central processing unit (CPU), a graphics processing unit (GPU), or both), a main memory 904 and a static memory 906, which communicate with each other via a bus 908. The computer system 900 may further include a video display unit 910 (e.g. a liquid crystal display (LCD) or a cathode ray tube (CRT)). The computer system 900 also includes an input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions (e.g., software) 924 embodying any one or more of the methodologies or functions described herein. The instructions 924 may also reside, completely or at least partially, within the main memory 904, the static memory 906, and/or within the processor 902 during execution thereof by the computer system 900. The main memory 904 and the processor 902 may also constitute machine-readable media. The instructions 924 may further be transmitted or received over a network 926 via the network interface device 920.

Software applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media and magnetic media. As noted, the software may be transmitted over a network 926 using a transmission medium. The term "transmission medium" shall be taken to include any medium that is capable of storing, encoding or carrying instructions for transmission to and execution by the machine, and includes digital or analogue communications signal or other intangible medium to facilitate transmission and communication of such software.

Thus, systems and methods to explicitly realign packets were disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

While certain exemplary embodiments have been described and shown in the accompanying drawings, it is to be understood that such embodiments are merely illustrative of and not restrictive of the broad disclosure, and that this disclosure not be limited to the specific constructions and arrangements shown and described, since various other modifications may occur to those ordinarily skilled in the art.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "Software as a Service" (SaaS). For example, at least some of the operations may be performed by a group of computers (as examples of machines including processors), with these operations being accessible via a network 926 (e.g., the Internet) and via one or more appropriate interfaces (e.g., Application Program Interfaces (APIs).)

Some embodiments may utilize the OSI model or TCP/IP protocol stack model for defining the protocols used by a network 926 to transmit data. In applying these models, a system of data transmission between a server and client, or between peer computer systems, is illustrated as a series of roughly five layers comprising: an application layer, a transport layer, a network layer, a data link layer 402, and a physical layer 150. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer 402. This frame is then encoded at the physical layer 150, and the data transmitted over a network 926 such as an internet, local area network (LAN), WAN, or some other suitable network 926. In some cases, "internet" refers to a network of networks 926. These networks 926 may use a variety of protocols for the exchange of data, including the aforementioned TCP/IP, and additionally asynchronous transfer mode (ATM), system network architecture (SNA), SDI, or some other suitable protocol. These networks 926 may be organized within a variety of topologies (e.g., a star topology) or structures.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a receiver to receive, at a first communications device, a first stream of bytes comprising a first packet, the first packet comprising a plurality of bytes, the plurality of bytes comprising a first byte, the first byte being located in a start of packet position of the first packet; and
   a transmitter to generate realignment information for the first packet based on an alignment restriction that is associated with a data path that is associated with an interface, the transmitter to transmit, from the first communications device, over the data path, a second stream of bytes, the second stream of bytes comprising the first packet and the realignment information, the transmission of the first byte of the first packet over the data path is in accordance with the alignment restriction that is associated with the interface, wherein the realignment information is a value that identifies a difference between a time that the first byte of the first packet would have been transmitted by the first communications device without the alignment restriction that is associated with the interface and a time of transmission of the first byte of the first packet by the first communications device in accordance with the alignment restriction associated with the interface.

2. The system of claim 1, wherein the receiver further receives at the first communications device, a first plurality of streams, wherein the first plurality of streams comprises the first stream of bytes and the second stream of bytes, wherein the first stream of bytes comprises the first packet, and wherein the second stream of bytes comprises a second packet.

3. The system of claim 2, wherein the first communications device includes a plurality of outgoing lanes, wherein the transmission of the second stream of bytes includes a transmission of the first byte that is located in the start of packet position of the first packet over any one of the plurality of outgoing lanes in accordance with the alignment restriction associated with the interface.

4. The system of claim 1, wherein the transmitter stores the realignment information in any one of the preamble of the first packet or an inter-packet gap that is contiguous with the first packet.

5. The system of claim 1, further comprising: at a second communications device: a receiver that receives, over the data path, the second stream of bytes and the realignment information, the second stream of bytes comprising the first packet.

6. The system of claim 5, further comprising: at the second communications device: a transmitter to retrieve the realignment information from the second stream of bytes based on realignment position information that is associated with the interface.

7. The system of claim 6, wherein the transmitter at the second communications device further realigns the first packet in the second stream of bytes based on the realignment information, the realignment information identifies the difference between the time that the first byte of the first packet would have been transmitted by the first communications device without the alignment restriction that is associated with the interface and the time of transmission of the first byte of the first packet by the first communications device in accordance with the alignment restriction associated with the interface.

8. The system of claim 1, where the first communications device is selected from a group of communication devices consisting of a MAC and a PHY.

9. The system of claim 1 wherein the data path is selected from a group of data paths consisting of a 10 Gigabit Attachment Unit Interface (XAUI) and a 10 Gigabit Interface Media Independent Interface (XGMII).

10. The system of claim 1 wherein the data path is a high speed serial electrical interfaces for 10 Gb/s small form-factor pluggable transceiver (XFP) modules (XFI and SFI).

11. A method comprising, at a first communications device:
receiving a first stream of bytes comprising a first packet, the first packet comprising a plurality of bytes, the plurality of bytes comprising a first byte, the first byte being located in a start of packet position of the first packet;
generating realignment information for the first packet based on an alignment restriction that is associated with a data path that is associated with an interface;
transmitting, over the data path, a second stream of bytes, the second stream of bytes comprising the first packet and the realignment information, the transmitting of the first byte of the first packet over the data path being in accordance with the alignment restriction that is associated with the interface;
wherein the realignment information is a value that identifies a difference between a time that the first byte of the first packet would have been transmitted by the first communications device without the alignment restriction associated with the interface and a time of transmission of the first byte of the first packet by the first communications device in accordance with the alignment restriction associated with the interface.

12. The method of claim 11, further comprising, receiving at the first communications device a first plurality of streams, wherein the first plurality of streams comprises the first stream of bytes and the second stream of bytes, wherein the first stream of bytes comprises the first packet, and wherein the second stream of bytes comprises a second packet.

13. The method of claim 12, wherein the first communications device includes a plurality of outgoing lanes, wherein the transmitting the second stream of bytes includes transmitting the first byte that is located in the start of packet position of the first packet over any one of the outgoing lanes in accordance with the alignment restriction associated with the interface.

14. The method of claim 11, further comprising storing the realignment information in any one of the preamble of the first packet or an inter-packet gap that is contiguous with the first packet.

15. The method of claim 11, further comprising: at a second communications device: receiving, over the data path, the second stream of bytes and the realignment information, the second stream of bytes comprising the first packet.

16. The method of claim 15, further comprising: at the second communications device: retrieving the realignment information from the second stream of bytes based on realignment position information that is associated with the interface.

17. The method of claim 16, further comprising: at the second communications device: realigning the first packet in the second stream of bytes based on the realignment information, the realignment information identifying the difference between the time that the first byte of the first packet would have been transmitted by the first communications device without the alignment restriction associated with the interface and the time of transmission of the first byte of the first packet by the communications device in accordance with the alignment restriction associated with the interface.

18. The method of claim 11, where the first communications device is selected from a group of communication devices consisting of a MAC and a PHY.

19. The method of claim 11 wherein the data path is selected from a group of data paths consisting of a 10 Gigabit Attachment Unit Interface (XAUI) and a 10 Gigabit Interface Media Independent Interface (XGMII).

20. Software encoded on one or more non-transitory, computer-readable media and when executed operable to:
receive a first stream of bytes comprising a first packet, the first packet comprising a plurality of bytes, the plurality of bytes comprising a first byte, the first byte being located in a start of packet position of the first packet;

generate realignment information for the first packet based on an alignment restriction that is associated with a data path that is associated with an interface;

transmit over the data path, a second stream of bytes, the second stream of bytes comprising the first packet and the realignment information, the transmission of the first byte of the first packet over the data path being in accordance with the alignment restriction that is associated with the interface;

wherein the realignment information is a value that identifies a difference between a time that the first byte of the first packet would have been transmitted by the first communications device without the alignment restriction associated with the interface and a time of transmission of the first byte of the first packet by the first communications device in accordance with the alignment restriction associated with the interface.

* * * * *